Dec. 14, 1965   L. H. STAUFFER   3,223,885
STABILIZATION CIRCUIT FOR ELECTRON BEAM APPARATUS
Filed April 29, 1963   3 Sheets-Sheet 1
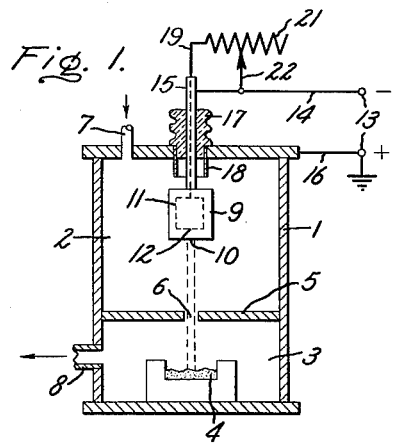
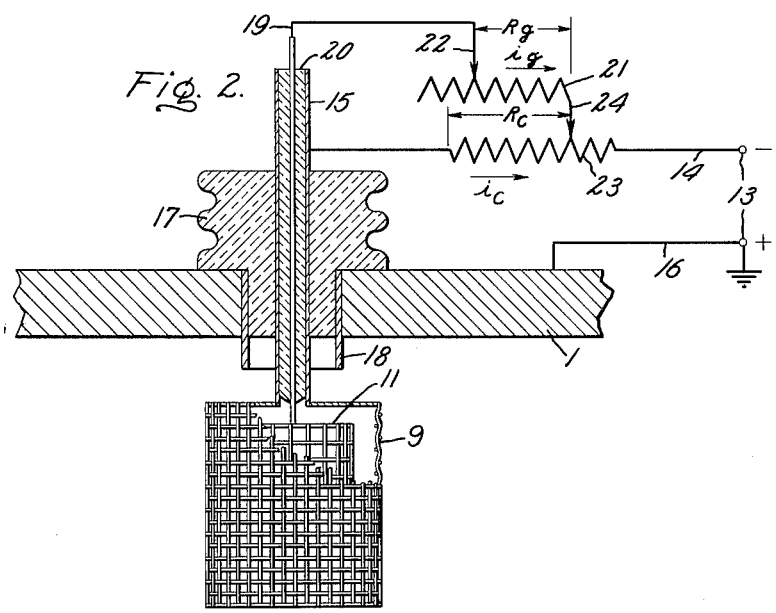
Inventor:
Lynn H. Stauffer,
by Paul A. Frank
His Attorney.

Inventor:
Lynn H. Stauffer,
by Paul A. Frank
His Attorney.

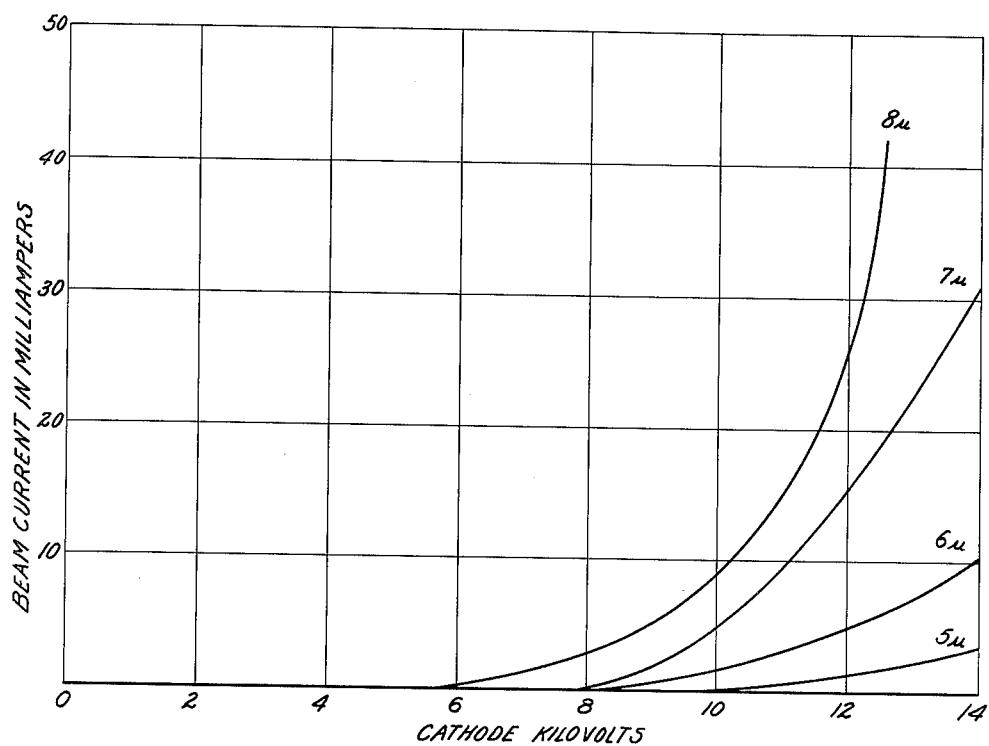

United States Patent Office 3,223,885
Patented Dec. 14, 1965

3,223,885
STABILIZATION CIRCUIT FOR ELECTRON
BEAM APPARATUS
Lynn H. Stauffer, Pattersonville, N.Y., assignor to General
Electric Company, a corporation of New York
Filed Apr. 29, 1963, Ser. No. 276,413
8 Claims. (Cl. 315—111)

My invention relates to certain improvements in electron beam irradiation apparatus of the gaseous beam type whereby the intensity of the beam may be more effectively controlled, and in particular, to an improvement in the manner of controlling electron beam current produced by an electron beam apparatus of the type described in my copending United States patent application, Serial No. 247,730, filed December 27, 1962, entitled "Self-Focusing Electorn Beam Apparatus," and assigned to the assignee of the present invention.

The electron beam apparatus described in the above copending United States patent application is especially useful for welding, heating, and processing materials in controlled environments. The apparatus comprises a housing within which is positioned a hollow perforated cathode structure adapted to be operable in an ionizable gaseous medium and to be operated at a high negative potential relative to the housing, sufficient to produce a body of ionizable gas or plasma within the cathode. The cathode is provided with an aperture through which an electron beam issues from the plasma and passes to a workpiece upon which it impinges and produces a desired effect. Within a particular range of gas pressure and cathode-to-housing potential, interaction between the gaseous medium and high potential generates a finely focused or collimated electron beam having a total current or beam intensity determined by the gas pressure and electrical potential. A control electrode structure is positioned within the cathode and electrically insulated therefrom. This control electrode has an aperture aligned with the cathode aperture through which the electron beam passes. The control electrode may be connected to a suitable source of controllable low voltage whereby its potential relative to the cathode is adjustable over a desired range and thereby obtains a wide range of control of beam intensity independent of beam focus.

While the hereinbefore described electron beam apparatus is satisfactory for welding, heating, and irradiation applications, certain improvements may be desirable to more effectively control the electron beam. In particular, it may be more convenient to provide a means for automatically stabilizing the beam intensity during spurious variations in the gas pressure or in the cathode supply voltage which provides the high negative potential rather than by manually controlling these parameters.

Therefore, one of the principal objects of my invention is to provide a means for maintaining an automatic stabilization of beam intensity during moderate variations in the gas pressure and cathode supply voltage.

A further object of my invention is to effect such control by providing an electrical circuit comprising relatively few elements to thereby produce such control largely with facility characteristic of other types of discharge devices.

Briefly stated, and in accordance with my invention, I provide a first adjustable resistance in a series circuit comprising the cathode and cathode supply voltage and further provide a second adjustable resistance connected in a circuit between the control electrode and first resistance. A predetermined adjustment of these two resistances determines a beam mode of operation at a selected operating point of the electron beam apparatus in terms of the beam current and control electrode-to-cathode potential for a particular cathode voltage and gas pressure. This predetermined adjustment of the resistances also provides an automatic stabilization or self-regulation of the beam intensity whereby the electron beam is controlled within a narrow range of beam current during moderate variations in the gas pressure or cathode supply voltage. The electron beam thus produced is especially useful in high quality metal working such as cutting, welding, brazing, and also in fusing dissimilar materials including refractory substances such as porcelain to tantalum wherein high processing temperatures in the order of 3000° C. are required.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character, and wherein:

FIGURE 1 is an elevation view, partly in section, illustrating an electron beam irradiation apparatus constructed in accordance with my invention;

FIGURE 2 is a detail view of a first embodiment of a self-regulating circuit for controlling electron beam current in accordance with my invention;

Figure 3:
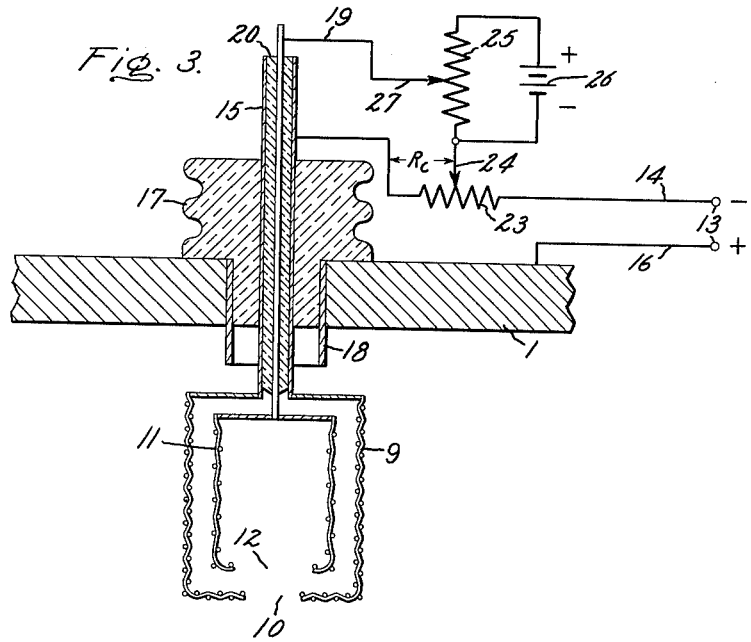
FIGURE 3 is a detail view of a second embodiment of a self-regulating circuit for controlling electron beam current in accordance with my invention.
Figure 4:
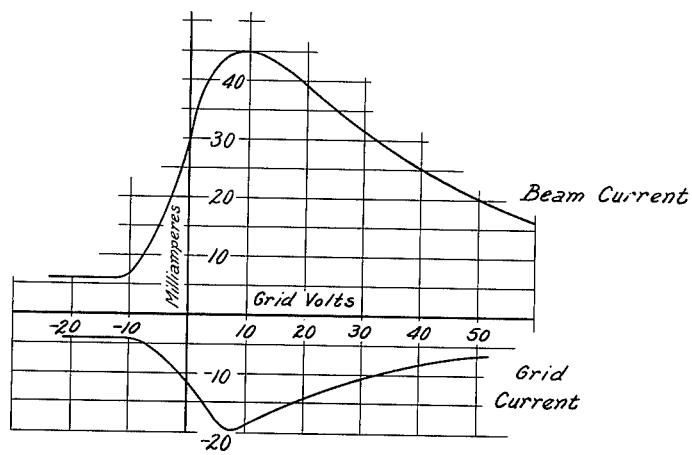

FIGURE 4 illustrates typical characteristic curves of beam current and control electrode current as a function of the control electrode-to-cathode potential for the electron beam apparatus illustrated in FIGURES 1–3; and FIGURE 5 illustrates a family of curves indicating the variation of the magnitude of beam current with cathode voltage for various pressures of the gaseous medium maintained within the electron beam apparatus.

Referring particularly to the apparatus illustrated in FIGURE 1, there is shown a housing or enclosure designated as a whole by numeral 1. The housing is constructed of an electrically conductive and nonporous material such as metal. The interior of housing 1 may consist of a single chamber or a plurality of chambers, the particular apparatus illustrated in FIGURE 1 having a first chamber 2 for containing the cathode and control electrode structures and a second chamber 3 for containing the workpiece 4 to be irradiated by the electron beam emitted from the cathode. Chambers 2 and 3 are separated by a partitioning member 5 which may be made of the same material as housing 1. An aperture 6 within partitioning member 5 is of size sufficient merely to permit passage of an electron beam therethrough. A suitable ionizable gas, such as argon or helium, is introduced into the interior of chamber 2 through passage means 7 and the gas pressure within chamber 2 is maintained within a desired low pressure range by means of a controlled exhaust pumping system (not shown) which exhausts the gaseous medium through passage means 8.

The electron source consists of a hollow perforated cathode structure 9, preferably in the form of a cylinder, although other shapes may be employed, with an aperture 10 in the center of a bottom end wall thereof where-from an electron beam is emitted by nonthermionic means in a manner more fully described in the above referenced copending patent application. A control electrode structure 11 is positioned within the cathode and is electrically insulated therefrom. Control electrode 11 is provided with an aperture 12 which is adjacent cathode aperture 10 and substantially aligned with apertures 6 and 10. Control electrode structure 11 may be shaped in general conformity to the cathode structure and have a surface similar to that of the cathode surface and preferably characterized by a greater open area per unit of surface than the cathode.

A power supply (not shown) is connected to terminals 13 and supplies a relatively high adjustable direct current voltage to the cathode. Thus, the cathode is operated at a high negative potential relative to housing 1 which functions as the anode. The voltage is applied to cathode 9 by means of conductor 14 and cathode stem 15 connected thereto. The positive or ground side of the power supply line is connected to housing 1 by means of conductor 16. Cathode stem 15 comprises a hollow tubular electrically conductive member, preferably made of stainless steel, that supports cathode 9 and positions it within housing 1. Cathode stem 15 is insulated from housing 1 by means of insulating bushing 17. A hollow tubular electrically conductive shield 18, concentric with cathode stem 15 and spaced therefrom is positioned along the upper portion of stem 15 contained with housing 1 and in good electrical contact therewith to prevent long-path discharge between the cathode stem and housing 1. The high voltage supplied at terminal 13 is adjustable to 100 kilovolts or more. The pressure of the gaseous medium is adjustable up to approximately 50 microns or more and the particular pressure necessary to maintain beam mode operation is dependent on the particular cathode voltage and gas employed. Interaction between the high negative potential of the cathode relative to the housing and the ionizable gaseous medium contained within the housing produces a glowing body of plasma or ionized gas within the cathode structure. Electrons are emitted from this plasma body and pass through control electrode aperture 12 and cathode aperture 10 in the direction of workpiece 4. Within particular narrow ranges of cathode-to-housing potential and pressure of the gaseous medium, the electron emission from cathode aperture 10 forms a well-collimated beam of electrons which may be used to irradiate workpiece 4.

Control of the beam intensity, that is, the total current within the electron beam, over a substantial range of beam current may be obtained by simultaneously adjusting the gas pressure and cathode-to-housing potential. However, the beam is not self-focusing by this means of control and it can be appreciated that for applications such as welding or cutting, an electron beam having a high power concentration, that is, a finely focused or collimated beam, is generally desired over a wide range of beam intensity control.

The intensity of the beam may be controlled without affecting its focus by supplying a relatively low voltage to control electrode 11 by means of conductor 19 which passes through cathode stem 15 and is electrically insulated therefrom by insulation material 20 which is appropriate to the potential applied between the cathode and housing and also forms a gas-tight seal. This control voltage may be obtained from an adjustable low voltage source, or as indicated in FIGURE 1, by means of rheostat 21 connected between control electrode conductor 19 and cathode conductor 14. This latter circuit is a self-biasing arrangement whereby the control electrode may be adjusted to a positive potential with respect to the cathode by adjusting the movable arm 22 of rheostat 21. The control obtained by employing a low voltage source is of the nonautomatic type, that is, in the presence of a spurious variation in the pressure of the gaseous medium or the cathode supply voltage, the output voltage of the low voltage source must be readjusted to maintain a desired beam current.

A self-regulation or automatic stabilization of the electron beam current is obtained in a first embodiment of a control circuit as illustrated in FIGURE 2. In this particular arrangement, a potentiometer 23 is connected in series with cathode 9 and the negative terminal of the cathode power supply. The direction of conventional current flow in rheostat 21 and potentiometer 23 is indicated by arrows $i_g$ and $i_c$, respectively, wherein $i_g$ is the control electrode or grid current and $i_c$ is the cathode current. The portions of rheostat 21 and potentiometer 23 which determine the control electrode-to-cathode potential are designated as $R_g$ and $R_c$, respectively. It can be seen that an increase in the resistance of $R_c$ lowers the control electrode potential with respect to the cathode, that is, produces a more negative control electrode-to-cathode potential since the control electrode is coupled to the movable arm 24 of potentiometer 23 and is thus at a more negative voltage than the cathode. Such increase in resistance of $R_c$ produces an opposing effect to the change in control electrode-to-cathode potential as produced by resistance $R_g$. Thus, adjustment of resistance $R_c$ alone, while maintaining $R_g$ at zero, permits operation of the electron beam apparatus only in the negative control electrode-to-cathode potential (grid volts) region of the characteristic curve illustrated in FIGURE 4. Alternatively, adjustment of resistance $R_g$ alone, while maintaining $R_c$ at zero, permits operation only in the positive grid volts region. In this latter case, a subsequent adjustment of $R_c$ locates the operating point along the characteristic curve in a less positive grid volts direction. Resistance $R_c$ may be increased or $R_g$ decreased to a point where the voltage drop across resistance $R_c$ is equal to the voltage drop across $R_g$, that is, sufficient to raise the control electrode voltage to the cathode voltage and thereby permit operation of the apparatus in the vicinity of the zero grid volts region along the characteristic curve. Resistance $R_c$ may then be further increased or $R_g$ decreased to permit operation in the negative grid volts region, or the resistances may be adjusted to permit operation in the positive grid volts region.

A desired regulation of the beam current is obtained by properly selecting the resistance values of $R_g$ and $R_c$. The desired regulation may automatically stabilize the beam current at a substantially constant value but it is more generally desired to maintain beam current within a predetermined narrow range of current. The values of resistances $R_g$ and $R_c$ are selected to permit a larger change in the control electrode voltage than in the cathode voltage and thereby prmit an automatic or self-regulating control of the beam current while maintaining the cathode at a substantially constant voltage. Thus, referring particularly to the characteristic curves of FIGURE 4 wherein the cathode and control electrodes are contained in a gaseous medium of argon at 7 microns pressure, and the cathode-to-anode potential is 11.0 kv., the control electrode or grid current is approximately one-half the magnitude of the beam current, the beam current is approximately equal to the cathode current, and resistance $R_g$ is made slightly larger than twice the resistance $R_c$. Under these conditions, change in the beam current due to moderate changes in the high voltage supplied to terminals 13 or changes in the pressure of the gaseous medium is automatically stabilized by the changes in voltage drops across $R_g$ and $R_c$ produced by the changing currents flowing therethrough. The net change in these voltage drops is in such direction as to restore the beam current to its original value. It should be understood that the electron beam current stabilization control produces the desired effects only in the presence of moderate changes in supply voltage or gas pressure, that is, control action is obtained for changes up to approximately a ±10 percent change in voltage and gas pressure. The beam current variation for such maximum change is approximately ±1.0 percent. Further, the control action is limited to operation in particular regions of the characteristic curve illustrated in FIGURE 4. Thus, adjustment of $R_g$ and $R_c$ for operation in the negative grid volts region and in the slightly positive grid volts region below the peak in the beam current curve produces effective control action only while operation is restricted to these regions. A sudden abnormally large change in the high voltage supply or gas pressure whereby the operating point shifts to the positive grid volts region beyond the peak in the beam current curve renders the control action ineffective. In like manner, a sudden change in the operating point from the positive grid volts region beyond the beam current peak to the other side thereof renders the control action ineffective.

The utilization of but one of the resistances $R_g$ or $R_c$ as a control element provides a moderate stabilization control which is also limited to a particular operating region. Thus, adjusting potentiometer $R_c$ to its zero resistance value permits operation limited to the positive grid volts region and stabilization control which is effective only in the positive grid volts region beyond the beam current peak by adjusting $R_g$ to a value greater than zero ohms. In the second case, adjusting rheostat $R_g$ to zero resistance permits operation and stabilization control which is limited to the negative grid volts region by adjusting potentiometer $R_c$ to a value greater than zero ohms. By proper adjustment of the resistance of rheostat $R_g$ and potentiometer $R_c$, the benefits of each individual control action is obtained and thereby a more accurately stabilized system is provided which is operable in any desired region of the characteristic curve.

Referring particularly to FIGURE 3, there is shown a second embodiment of a stabilization circuit constructed in accordance with my invention. In this particular circuit, a potentiometer 25 is connected in the control electrode circuit and a source of direct current voltage such as, for example, battery 26 is connected across potentiometer 25. The polarity of voltage source 26 and the position of the movable arm 27 of potentiometer 25, in combination with the adjustment of potentiometer 23 determines the control electrode-to-cathode potential and thus, the operating point along the characteristic curve in FIGURE 4. The voltage drop due to grid current flowing through the portion of potentiometer 25 between movable arms 27 and 24 is negligible with respect to the voltage across such resistance portion as determined by voltage source 26. Thus, a substantially fixed voltage exists across such portion of potentiometer 25 which is in the control electrode and cathode circuit and the control action is determined primarily by changes in voltage drop occurring across cathode potentiometer $R_c$ in a manner as described for the operation of the control circuit in FIGURE 2. The polarity of source 26 is selected to permit operation of the electron beam apparatus in the positive or negative grid volts region of the characteristic curve.

FIGURE 5 illustrates a family of curves which indicate the variation of beam current with cathode voltage for various pressures of the gaseous medium. The particular gas is argon and the pressure is in microns ($\mu$). These curves are applicable to a perforated cylindrical cathode structure having a diameter of 1⅛ inch, a length of 1¼ inch, and an exit aperture of ¼ inch, with an operating characteristic similar to that illustrated in FIGURE 4. The curves of FIGURE 5 are obtained for an apparatus not including a control electrode. It may be seen that an increase in the cathode voltage, that is, an increase in the voltage supplied at terminals 13 or an increase in the gas pressure produces an increase in the beam current and thus indicates the necessity for providing a control of this beam current in the presence of changes in these two parameters.

From the foregoing description, it can be appreciated that my invention makes available a control system for stabilizing the electron beam current produced by an apparatus comprising a perforated hollow cathode operable at a relatively high negative voltage and a control electrode structure disposed within such cathode, the cathode and control electrode being operable in a relatively low pressure gaseous medium. The electron beam is non-thermionically emitted through an exit aperture in the cathode and the beam current which comprises this electron beam is stabilized by means of properly adjusted resistances in the control electrode and cathode circuits. The stabilization provides for control of the beam within a relatively narrow range of beam current for moderate changes in the voltage supply to the cathode or in the gas pressure.

Having described a new and improved control circuit for stabilizing an electron beam generated by a particular apparatus, it is believed obvious that modification and variation of my invention are possible in the light of the above teachings. Thus, a direct current voltage source, such as a battery, may be serially connected in the control electrode circuit of FIGURE 2 between the control electrode and movable arm 22 of rheostat 21 to determine a control electrode voltage bias. It is, therefore, to be understood that changes may be made in the particular embodiments as described which are within the full intended scope of the invention as defined by the following claims.

What I claim as new and desire to secure by Letters Patent of the United States is:

1. The combination of a cathode comprising a hollow perforated structure adapted for use in an ionizable gaseous medium and to be operated at a high negative potential relative to the enclosure of said medium sufficient to produce a plasma within the cathode, said cathode having an aperture through which an electron beam issues from the plasma, with a control electrode comprising a structure being positioned within said cathode and electrically insulated therefrom, said control electrode having an aperture aligned with said cathode aperture through which said beam passes whereby the magnitude of current in said beam may be varied by varying the potential between said control electrode and cathode, and means connected in an electrical circuit which couples the cathode and control electrode for automatically regulating the magnitude of the beam current.

2. The combination of a cathode comprising a hollow perforated structure, said cathode positioned within an enclosure adapted to contain a low pressure ionizable gaseous medium, said cathode to be operated at a high negative potential relative to the enclosure sufficient to generate a plasma within the cathode, said cathode having an aperture through which an electron beam issues from the plasma to the exterior of said cathode, with a control electrode comprising a structure being positioned within said cathode and electrically insulated therefrom, said control electrode having an aperture aligned with said cathode aperture through which said beam passes whereby the magnitude of current in said beam may be varied by varying the potential between said control electrode and cathode, and adjustable resistance means connected in an electrical circuit which couples the cathode and control electrode for automatically stabilizing the electron beam intensity independently of variations in the high negative potential and pressure of the gaseous medium.

3. In an electron beam welding apparatus comprising a cathode comprising a hollow perforated structure adapted for use in a low pressure ionizable gaseous medium and to be operated at a high negative potential relative to the enclosure of said medium sufficient to produce a plasma within the cathode, said cathode having an aperture through which an electron beam issues from the plasma, a control electrode comprising a structure being positioned within said cathode and electrically insulated therefrom, said control electrode having an aperture aligned with said cathode aperture whereby the magnitude of current in said beam may be varied independently of the beam focus by varying a low potential between said control electrode and cathode, a first variable resistance connected to said control electrode, and a second variable resistance having a first end connected to said cathode and a second end connected to the negative terminal of a high voltage supply which provides the high negative potential, said first resistance connected to a variable point on said second resistance whereby the low potential between said control electrode and cathode may be developed, said first and second resistances being adjusted to selected magnitudes of resistance whereby the beam current is automatically stabilized in response to moderate variations in the high voltage supply and pressure of the gaseous medium.

4. The combination set forth in claim 3 wherein a low voltage source is connected across the ends of said first resistance.

5. In an electron beam welding apparatus comprising
a cathode comprising a hollow perforated structure adapted for use in a low pressure ionizable gaseous medium and to be operated at a high negative potential relative to the enclosure of said medium sufficient to produce a plasma within the cathode, said cathode having an aperture through which an electron beam issues from the plasma, a control electrode comprising a structure being positioned within said cathode and electrically insulated therefrom, said control electrode having an aperture aligned with said cathode aperture whereby the magnitude of current in said beam may be varied independently of the beam focus by varying a low potential between said control electrode and cathode, a potentiometer having a first end connected to said cathode and a second end connected to the negative terminal of a high voltage supply which provides the high negative potential, said control electrode connected to the movable arm of said potentiometer whereby the low potential of said control electrode relative to said cathode is of negative polarity and the beam current is automatically stabilized during intervals of moderate variations in the high voltage supply and pressure of the gaseous medium.

6. In an electron beam welding apparatus comprising
a cathode comprising a hollow perforated structure adapted for use in a low pressure ionizable gaseous medium and to be operated at a high negative potential relative to the enclosure of said medium sufficient to produce a plasma within the cathode, said cathode having an aperture through which an electron beam issues from the plasma, said cathode connected to the negative terminal of a high voltage supply which provides the high negative potential, a control electrode comprising a structure being positioned within said cathode and electrically insulated therefrom, said control electrode having an aperture aligned with said cathode aperture whereby the magnitude of current in said beam may be varied independently of the beam focus by varying a low potential between said control electrode and cathode, and a variable resistance having at least two terminals, said control electrode connected to a first terminal of said resistance, said cathode connected to a second terminal of said resistance whereby the low potential of said control electrode relative to said cathode is of positive polarity and the beam current is automatically stabilized during intervals of moderate variations in the high voltage supply and pressure of the gaseous medium.

7. In an electron beam welding apparatus comprising
a housing, a cathode comprising a hollow perforated structure adapted for use in a low pressure ionizable gaseous medium, said cathode positioned within said housing and electrically insulated therefrom, said cathode having an aperture through which an electron beam may issue, a first electrical conductor connected to said cathode and passing through a wall of said housing and electrically insulated therefrom whereby a high negative potential may be applied to said cathode relative to said housing and an interaction of the gaseous medium and potential produces a plasma contained within said cathode from which said beam issues, a first adjustable resistance connected in a first electrical series circuit including said cathode, said first electrical conductor and the negative terminal of a high voltage supply which provides the high negative potential, a control electrode positioned within said cathode structure and electrically insulated therefrom, said control electrode having an aperture aligned with the cathode aperture through which said beam issues, a second electrical conductor connected to said control electrode and passing through a wall of said housing and electrically insulated from said cathode and said housing whereby a low potential may be applied to said control electrode relative to said cathode and thereby control the intensity of the beam, and a second adjustable resistance connected in a second electrical series circuit including said control electrode, said second electrical conductor, and a variable point on said first resistance whereby control of the beam intensity may be automatically regulated, the regulation being responsive to variations in the high negative potential and pressure of the gaseous medium.

8. An automatic stabilization circuit in an electron beam apparatus of the high voltage gaseous beam type for maintaining a selected control of electron beam intensity independently of moderate variations in the high voltage supply and pressure of the gaseous medium comprising
a housing, a hollow perforated cathode structure adapted for use in a low pressure ionizable gaseous medium, said cathode positioned within said housing and electrically insulated therefrom, said cathode having an aperture through which an electron beam may issue, a first electrical conductor connected to said cathode and passing through said housing and electrically insulated therefrom whereby a controllable high negative potential may be impressed on said cathode relative to said housing, a first adjustable resistance connected in an electrical circuit including said cathode, said first electrical conductor and the negative terminal of a high voltage supply, a control electrode positioned within said cathode and electrically insulated therefrom, said control electrode having an aperture aligned with the cathode aperture through which said beam issues, a second electrical conductor connected to said control electrode and passing through said housing and electrically insulated from said cathode and said housing whereby a low potential may be impressed on said control electrode relative to said cathode and thereby control the intensity and focus of the beam, and a second adjustable resistance connected in an electrical circuit including said control electrode, said second electrical conductor and the movable arm of said first resistance, said first resistance and said second resistance being adjusted for operation of the electron beam apparatus in a particular operating range as determined by the cathode-to-control electrode potential, said first and second adjustable resistances comprising a circuit whereby the beam intensity is automatically stabilized in response to moderate variations in the high negative potential and pressure of the gaseous medium.

No references cited.

GEORGE N. WESTBY, *Primary Examiner.*